(12) United States Patent
Kramer

(10) Patent No.: US 10,059,311 B2
(45) Date of Patent: Aug. 28, 2018

(54) MULTICOLOR CAR WASH STATION AND PROCESS

(71) Applicant: AUTO DETAILING ENTERPRISES, LLC, Jupiter, FL (US)

(72) Inventor: Daniel R. Kramer, Rockdale, TX (US)

(73) Assignee: AUTO DETAILING ENTERPRISES, LLC, Jupiter, FL (US)

( * ) Notice: Subject to any disclaimer, the term of this patent is extended or adjusted under 35 U.S.C. 154(b) by 12 days.

(21) Appl. No.: 14/072,339

(22) Filed: Nov. 5, 2013

(65) Prior Publication Data

US 2015/0122297 A1 May 7, 2015

(51) Int. Cl.
*B60S 3/04* (2006.01)

(52) U.S. Cl.
CPC ........................ *B60S 3/04* (2013.01)

(58) Field of Classification Search
None
See application file for complete search history.

(56) References Cited

U.S. PATENT DOCUMENTS

| | | | |
|---|---|---|---|
| 5,439,020 A | 8/1995 | Lockhart | |
| 5,575,852 A * | 11/1996 | Chase | B60S 3/04 118/316 |
| 6,113,007 A | 9/2000 | Bagnara et al. | |
| 2003/0127119 A1 | 7/2003 | Scordo | |
| 2004/0020426 A1 * | 2/2004 | Mattia | C09G 1/00 118/300 |
| 2006/0144430 A1 * | 7/2006 | Ringdahl | B60S 3/00 134/123 |
| 2009/0139545 A1 * | 6/2009 | Rowlands | B60S 3/00 134/18 |
| 2011/0067738 A1 | 3/2011 | Molitor et al. | |
| 2013/0239992 A1 | 9/2013 | Detrick | |

FOREIGN PATENT DOCUMENTS

| | | | |
|---|---|---|---|
| DE | 94 12 131 U1 | 11/1995 | |
| FR | 2 921 571 | 4/2009 | |
| WO | WO 2007039266 A2 * | 4/2007 | ............... B60S 3/04 |

OTHER PUBLICATIONS

International Search Report dated Jan. 28, 2015 for PCT/US2014/053817, Sep. 3, 2014, 3 pgs.

* cited by examiner

*Primary Examiner* — Michael E Barr
*Assistant Examiner* — Cristi J Tate-Sims
(74) *Attorney, Agent, or Firm* — Brooks Kushman P.C.

(57) ABSTRACT

A system for cleaning an automobile having at least two colored cleaning streams includes a first mixing system for combining a first cleaning composition stream, a first concentrated color composition, and a first water stream to form a first diluted colored cleaning composition. A second mixing system combines a second cleaning composition stream, a second concentrated color composition, and a second water stream to form a second diluted colored cleaning composition. A first foaming system receives the first diluted colored cleaning composition. The first foam system delivers the first diluted colored cleaning composition to the vehicle. A second foaming system receives the second diluted colored cleaning composition. The second foam system delivers the second diluted colored cleaning composition to the vehicle.

15 Claims, 3 Drawing Sheets

MULTICOLOR CAR WASH STATION AND PROCESS

TECHNICAL FIELD

In at least one embodiment, the present invention is related to system for washing automobiles.

BACKGROUND

The automobile car wash industry is competitive due to the large number of car washes throughout the United States. In order to achieve an advantage, many car washes employ services that are not directly related to process of washing automobiles.

One example is the utilization of colored detergents to wash automobiles. Although such colored detergents provide some functional advantages, a significant advantage of these colored detergents is the aesthetic appeal these colored detergents provide to the customers. For example, many car washes use multiple colored detergents to provide a type of visual show to the customer as these colors are mixed during the washing of the automobile. In the typical prior art multicolored car wash, the color detergents are premixed with colorants by the detergent suppliers. The premixed colored detergents are plumbed into a car wash system, diluted with water, and then sprayed onto a vehicle as a foam. The user of the colored detergents has little control over the proportion of water that is combined with the detergent if a desired color intensity is to be obtained. This situation is further complicated by the differing lengths of the distance through which a vehicle passes during cleaning in different car washes as the amount of foaming need to be adjusted according the length.

Accordingly, there is a need for improved and more economical methods for using color detergent in automobile car washes.

SUMMARY

In at least one embodiment, the present invention solves at least one problem of the prior art by providing a system for cleaning an automobile having at least two colored cleaning streams. The system includes a first mixing system for combining a first cleaning composition stream, a first concentrated color composition, and a first water stream to form a first diluted colored cleaning composition. A second mixing system combines a second cleaning composition stream, a second concentrated color composition, and a second water stream to form a second diluted colored cleaning composition. An optional third mixing system combines a third cleaning composition stream, a third concentrated color composition, and a third water stream to form a third diluted colored cleaning composition. A first foaming system receives the first diluted colored cleaning composition. The first foam system delivers the first diluted cleaning colored composition to the vehicle. A second foaming system receives the second diluted colored cleaning composition. The second foam system delivers the second diluted colored cleaning composition to the vehicle. An optional third foaming system receives the third diluted colored cleaning composition. The third foam system delivers the third diluted colored cleaning composition to the vehicle. The first concentrated color composition, the second concentrated color composition, and the optional third concentrated color compositions are essentially free of cleaning surfactants.

The system includes a first cleaning composition stream, a second cleaning composition stream, a first concentrated color composition, a second concentrated color composition, a first water stream, and a second water stream. A first mixing block combines the first cleaning composition stream with the first concentrated colored composition while outputting a first colored cleaning composition. The second mixing block combines the second cleaning composition stream with the second concentrated colored composition while outputting a second colored cleaning composition. A first mixer combines the first water stream and the first colored cleaning composition to form a first diluted colored cleaning composition. A second mixer combines the second water stream and the second colored cleaning composition to form a second diluted colored cleaning composition. A first foaming system receives the first diluted colored cleaning composition and delivers the first diluted colored cleaning composition to the vehicle. A second foaming system receives the second diluted colored cleaning composition and delivers the second diluted colored cleaning composition to the vehicle. Characteristically, the first concentrated color composition and the second concentrated color composition are essentially free of cleaning surfactants.

In another embodiment, a system for cleaning a vehicle having at least two colored cleaning streams is provided. The system includes a first cleaning composition stream, a second cleaning composition stream, a third cleaning composition stream, a first concentrated color composition, a second concentrated color composition, a third concentrated color composition, a first water stream, a second water stream, and a third water stream. A first mixing block combines the first cleaning composition stream with the first concentrated colored composition while outputting a first colored cleaning composition. A second mixing block combines the second cleaning composition stream with the second concentrated colored composition while outputting a second colored cleaning composition. A third mixing block combines the third cleaning composition stream with the third concentrated colored composition while outputting a third colored cleaning composition. A first mixer combines the first water stream and the first colored cleaning composition to form a first diluted colored cleaning composition. A second mixer combines the second water stream and the second colored cleaning composition to form a second diluted colored cleaning composition. A third mixer combines the third water stream and the third colored cleaning composition to form a third diluted colored cleaning composition. A first foaming system receives the first diluted colored cleaning composition and delivers the first diluted colored cleaning composition to the vehicle. A second foaming system receives the second diluted colored cleaning composition and delivers the second diluted colored cleaning composition to the vehicle. A third foaming system that receives the third diluted colored cleaning composition, the third foam system delivering the third diluted colored cleaning composition to the vehicle. A fragrance delivery system provides a fragrance to an exterior surface of the vehicle. The first concentrated color composition, the second concentrated color composition, and the third concentrated color composition are essentially free of cleaning surfactants.

DETAILED DESCRIPTION

Figure 1:
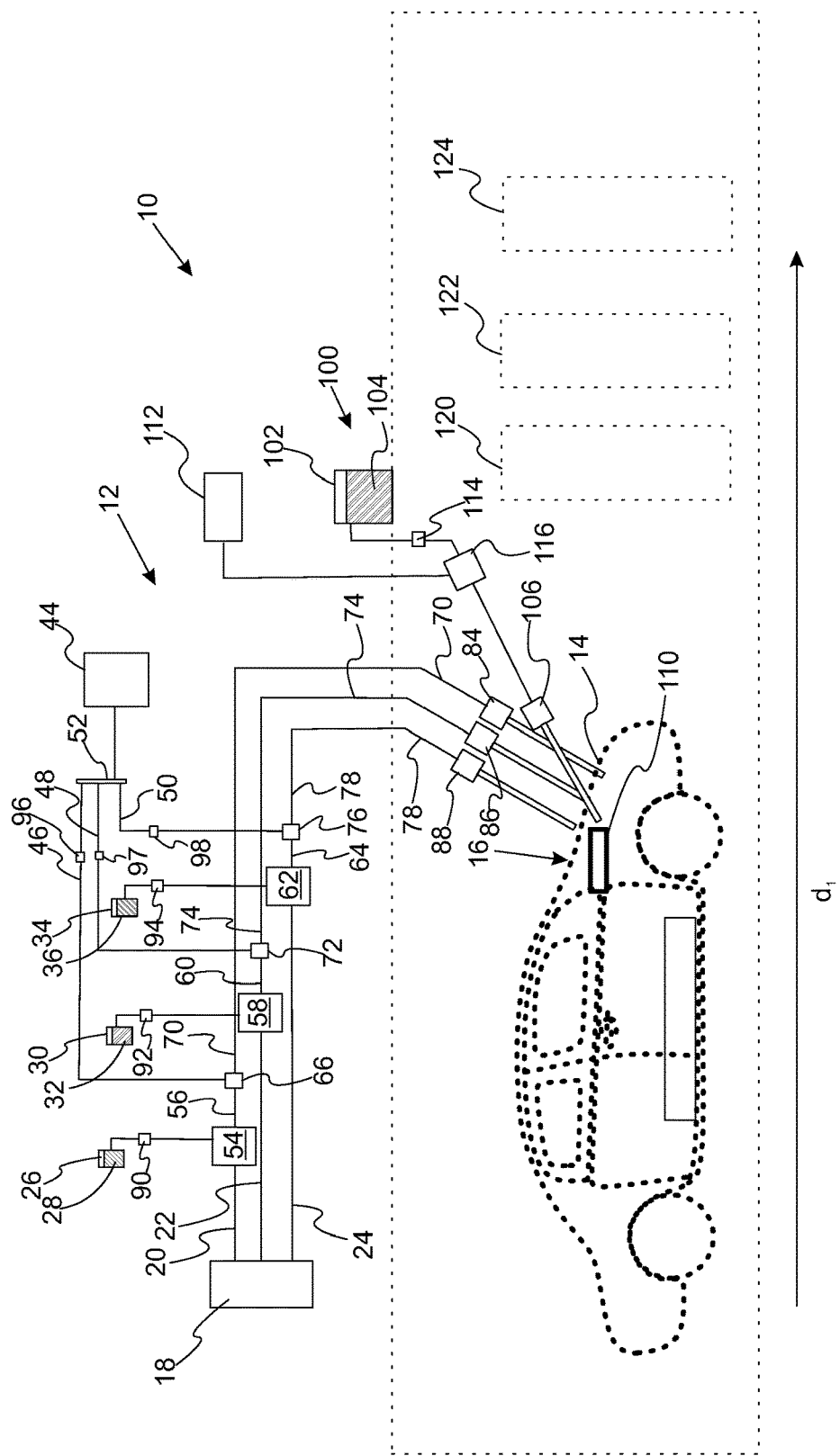
FIG. 1 is a schematic illustration of an embodiment of a car wash including a multi-color detergent delivery system.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The term "cleaning surfactants" as used herein refers the surfactants found in detergents and soaps that are used to clean vehicles.

The term "colorant" as used herein means a material that imparts color to a solution when added to the solution. Pigments are a type of colorant.

The term "pigment" as used herein means a material that changes the color of transmitted or reflected visible light by wavelength-selective absorption of light.

Embodiments of the present invention provide a system for cleaning an automobile having at least two colored cleaning streams. The system includes a first mixing system for combining a first cleaning composition stream, a first concentrated color composition, and a first water stream to form a first diluted colored cleaning composition. A second mixing system combines a second cleaning composition stream, a second concentrated color composition, and a second water stream to form a second diluted colored cleaning composition. An optional third mixing system combines a third cleaning composition stream, a third concentrated color composition, and a third water stream to form a third diluted colored cleaning composition. Each of the mixing systems combine these streams and composition while a vehicle is being washed with the diluted cleaning compositions. A first foaming system receives the first diluted colored cleaning composition. The first foam system delivers the first diluted colored cleaning composition to the vehicle. A second foaming system receives the second diluted colored cleaning composition. The second foam system delivers the second colored diluted cleaning composition to the vehicle. An optional third foaming system receives the third diluted colored cleaning composition. The third foam system delivers the third diluted colored cleaning composition to the vehicle. The first concentrated color composition, the second concentrated color composition, and the optional third concentrated color compositions are essentially free of cleaning surfactants. In one variation, a mixing system combines a cleaning composition stream with a concentrated color composition and then with a water stream. In another variation, a mixing system combines a water stream with a concentrated color composition and then with a concentrated cleaning composition stream. In another variation, a mixing system combines a water stream with a concentrated cleaning composition stream and then a concentrated color composition.

With reference to FIG. 1, a schematic illustration of a car wash system using multiple colored cleaning streams is provided. Car wash system 10 includes detergent delivery system 12 which provides colored cleaning steams to exterior vehicle surface 14 of vehicle 16 as the vehicle moves along direction $d_1$. Cleaning composition source 18 includes a detergent composition and is divided into a first cleaning composition stream 20, a second cleaning composition stream 22, and an optional third cleaning composition stream 24. Vessel 26 contains first concentrated color composition 28. Vessel 30 contains second concentrated color composition 32. Vessel 34 contains third concentrated color composition 36. Typically, the first, second, and third concentrated color compositions possess different colors. Although the present embodiment is not limited to any particular color combination, red, blue, and yellow color compositions are found to be particularly useful. Water source 44 is divided into first water stream 46, second water stream 48, and optional third water stream 50 by divider 52. First mixing block 54 combines the first cleaning composition stream 20 with first concentrated colored composition 28 while outputting first colored cleaning composition 56. Second mixing block 58 combines the second cleaning composition stream 22 with second concentrated colored composition 32 while outputting a second colored cleaning composition 60. In a refinement, third mixing block 62 combines third cleaning composition stream 24 with third concentrated colored composition 36 while outputting third colored cleaning composition 64. Examples of mixing blocks include pumps, T-joints, Y-joints and the like. It is readily recognized that such joints are the plumbing joints. In a variation, first concentrated color composition 28, second concentrated color composition 32, and third concentrated color composition 36 are essentially free of cleaning surfactants. In a refinement, "essentially free" means in this context that these concentrated cleaning compositions include less than, in increasing order of preference, 5 weight percent, 3 weight percent, 1 weight percent, 0.5 weight percent, 0.1 weight percent, and 0 weight percent cleaning surfactants. Similarly, first concentrated color composition 28, second concentrated color composition 32, and third concentrated color composition 36 are essentially free of fragrance composition. In a refinement, "essentially free" means in this context that these concentrated cleaning compositions include less than, in increasing order of preference, 5 weight percent, 3 weight percent, 1 weight percent, 0.5 weight percent, 0.1 weight percent, and 0 weight percent fragrance compositions.

Still referring to FIG. 1, first mixer 66 combines first water stream 46 and first colored cleaning composition 56 to form first diluted colored cleaning composition 70. Second mixer 72 combines second water stream 48 and second colored cleaning composition 60 to form second diluted colored cleaning composition 74. In a refinement, third mixer 76 combines third water stream 50 and third colored cleaning composition 64 to form third diluted colored cleaning composition 78. Examples of first mixer 66, second mixer 72, and third mixer 76 include but are not limited to T-joints and Y-joints, venturi injectors or pumps. In a refinement, the ratio of water to the first colored cleaning composition in the first diluted colored cleaning composition is from 75:1 to 500:1, a ratio of water to the second colored cleaning composition in the second diluted colored cleaning composition is from 75:1 to 500:1, and a ratio of water to the third colored cleaning composition in the third diluted colored cleaning composition is from 75:1 to 500:1. First foaming system 84 receives first diluted colored cleaning composition 70 and delivers the first diluted cleaning composition to vehicle surface 14 of vehicle 16. Second foaming system 86 receives second diluted colored cleaning composition 74 and delivers the second diluted cleaning composition to the vehicle surface 14 of vehicle 16. In a refinement, third foaming system 88 receives third diluted colored cleaning composition 78 and delivers the third diluted cleaning composition to the vehicle surface 14 of vehicle 16. In a refinement, first foaming system 84, second foaming system 86, and third foaming system 88 are each independently a nozzle and in particular, an air driven nozzle.

Still referring to FIG. 1, in a variation, detergent delivery system 12 includes first metering component 90 in fluid communication with vessel 26 which allows user adjustment of an amount of first concentrated color composition 28 combined with first cleaning composition stream 20. Second metering component 92 in fluid communication with vessel 30 allows user adjustment of an amount of second concentrated color composition 32 combined with the second cleaning composition stream 22. Third metering component 94 in fluid communication with vessel 34 allows user adjustment of the amount of third concentrated color composition 36 combined with the third cleaning composition stream 24. Examples for first metering component 90, second metering component 92, and third metering component 94 include, but are not limited to, needle valves. Cleaning composition delivery system 12 includes water regulators 96, 97, 98 to regulate and control the flow of first water stream 46, second water stream 48, and third water stream 50. Water regulators 96, 97, 98 allow for the appropriate dilution of the cleaning composition as set forth above. The dilution directly affects the foaming properties of the cleaning composition. In view of the fact that car wash systems are of differing lengths, adjustment of the cleaning composition dilution allows for an appropriate level of foaming for a given car wash, i.e., sufficient foaming during application of the colored cleaning stream when applied to the car combined with easy of removing the foam after cleaning of the vehicle is complete. First metering component 90, second metering component 92, and third metering component 94 allow for adjustment of the color intensities depending on the level of cleaning composition dilution that is used (i.e., as cleaning composition dilution is increased, the amount of colorant used for each stream is increased.)

In a variation of the present invention, car wash system 10 further includes fragrance delivery system 100 for providing a fragrance to an exterior surface of vehicle 14. Fragrance delivery system 100 includes a fragrance source vessel 102 holding fragrance composition 104 which is applied by applicator 106. Typically, applicator 106 is a nozzle positioned to provide the fragrance in vicinity of automobile air intake vent 110. In a refinement, fragrance composition 104 is combined with water from water source 112. Metering component 114 is used by a user to adjust the dilution of the fragrance composition with water. Examples of metering component 114 include, but are not limited to, needle valves. Mixing component 116 combines fragrance composition 104 with water.

Figure 2:
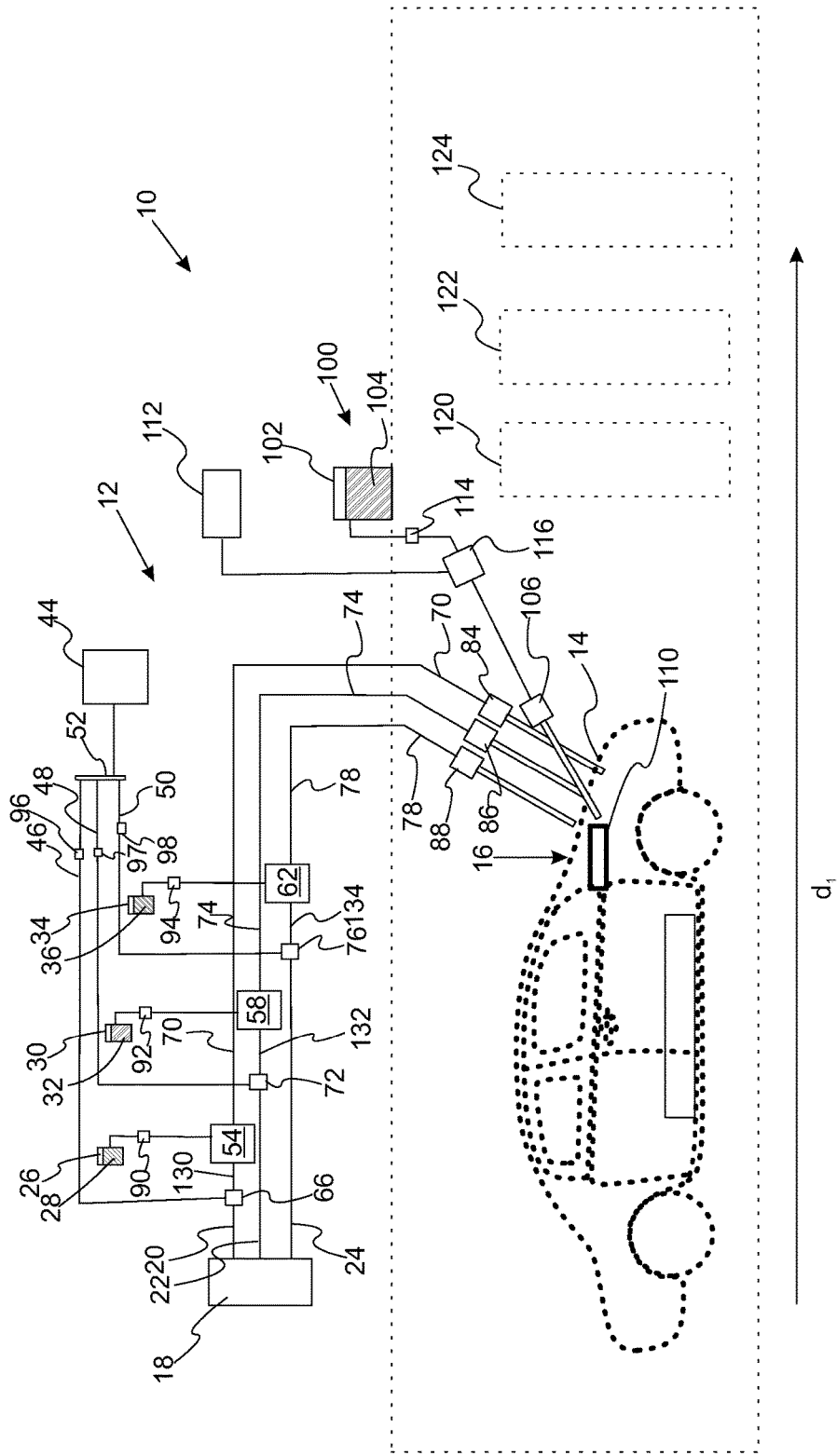
FIG. 2 is a schematic illustration of another embodiment of a car wash including a multi-color detergent delivery system.

With reference to FIG. 2, a schematic illustration of a car wash system using multiple colored cleaning streams is provided. Car wash system 10 includes detergent delivery system 12 which provides colored cleaning steams to exterior vehicle surface 14 of vehicle 16 as the vehicle moves along direction $d_1$. Cleaning composition source 18 includes a detergent composition and is divided into a first cleaning composition stream 20, a second cleaning composition stream 22, and an optional third cleaning composition stream 24. Water source 44 is divided into first water stream 46, second water stream 48, and optional third water stream 50 by divider 52.

Still referring to FIG. 2, first mixer 66 combines first water stream 46 and first cleaning composition 20 to form first diluted cleaning composition 130. Second mixer 72 combines second water stream 48 and second cleaning composition 22 to form second diluted cleaning composition 132. In a refinement, third mixer 76 combines third water stream 50 and third cleaning composition 24 to form third diluted cleaning composition 134. Examples of first mixer 66, second mixer 72, and third mixer 76 include but are not limited to T-joints, Y-joints, venturi injectors or pumps as set forth above. In a refinement, the ratio of water to the first cleaning composition is from 75:1 to 500:1, a ratio of water to the second composition is from 75:1 to 500:1, and a ratio of water to the third cleaning composition is from 75:1 to 500:1.

Still referring to FIG. 2, vessel 26 contains first concentrated color composition 28. Vessel 30 contains second concentrated color composition 32. Vessel 34 contains third concentrated color composition 36. Typically, the first, second, and third concentrated color compositions possess different colors as described above. First mixing block 54 combines first diluted cleaning composition 130 with first concentrated color composition 28 to form first diluted colored cleaning composition 70. Second mixing block 58 combines second diluted cleaning composition 132 with second concentrated colored composition 32 to form second diluted colored cleaning composition 74. In a refinement, third mixing block 62 combines diluted cleaning composition 134 with third concentrated colored composition 36 to form third diluted colored cleaning composition 78. Examples of suitable mixing blocks as set forth above. In a variation, first concentrated color composition 28, second concentrated color composition 32, and third concentrated color composition 36 are essentially free of cleaning surfactants as set forth above. First foaming system 84 receives first diluted colored cleaning composition 70 and delivers the first diluted colored cleaning composition to vehicle surface 14 of vehicle 16. Second foaming system 86 receives second diluted colored cleaning composition 74 and delivers the second diluted colored cleaning composition to the vehicle surface 14 of vehicle 16. In a refinement, third foaming system 88 receives third diluted colored cleaning composition 78 and delivers the third diluted colored cleaning composition to the vehicle surface 14 of vehicle 16. In a refinement, first foaming system 84, second foaming system 86, and third foaming system 88 are each independently a nozzle and in particular, an air driven nozzle.

Still referring to FIG. 2, in a variation, detergent delivery system 12 includes first metering component 90 in fluid communication with vessel 26 which allows user adjustment of an amount of first concentrated color composition 28 combined with first diluted cleaning composition 130. Second metering component 92 in fluid communication with vessel 30 allows user adjustment of an amount of second concentrated color composition 32 combined with second diluted cleaning composition 132. Third metering component 94 in fluid communication with vessel 34 allows user adjustment of the amount of third concentrated color composition 36 combined with third diluted cleaning composition 134. Examples for first metering component 90, second metering component 92, and third metering component are set forth above. Cleaning composition delivery system 12 includes water regulators 96, 97, 98 to regulate and control the flow of first water stream 46, second water stream 48, and third water stream 50 also as set forth above.

In a variation of the present embodiment, car wash system 10 further includes fragrance delivery system 100 for providing a fragrance to an exterior surface of vehicle 14. The details of fragrance delivery system 100 as set forth above in connection with the description of FIG. 1.

Figure 3:
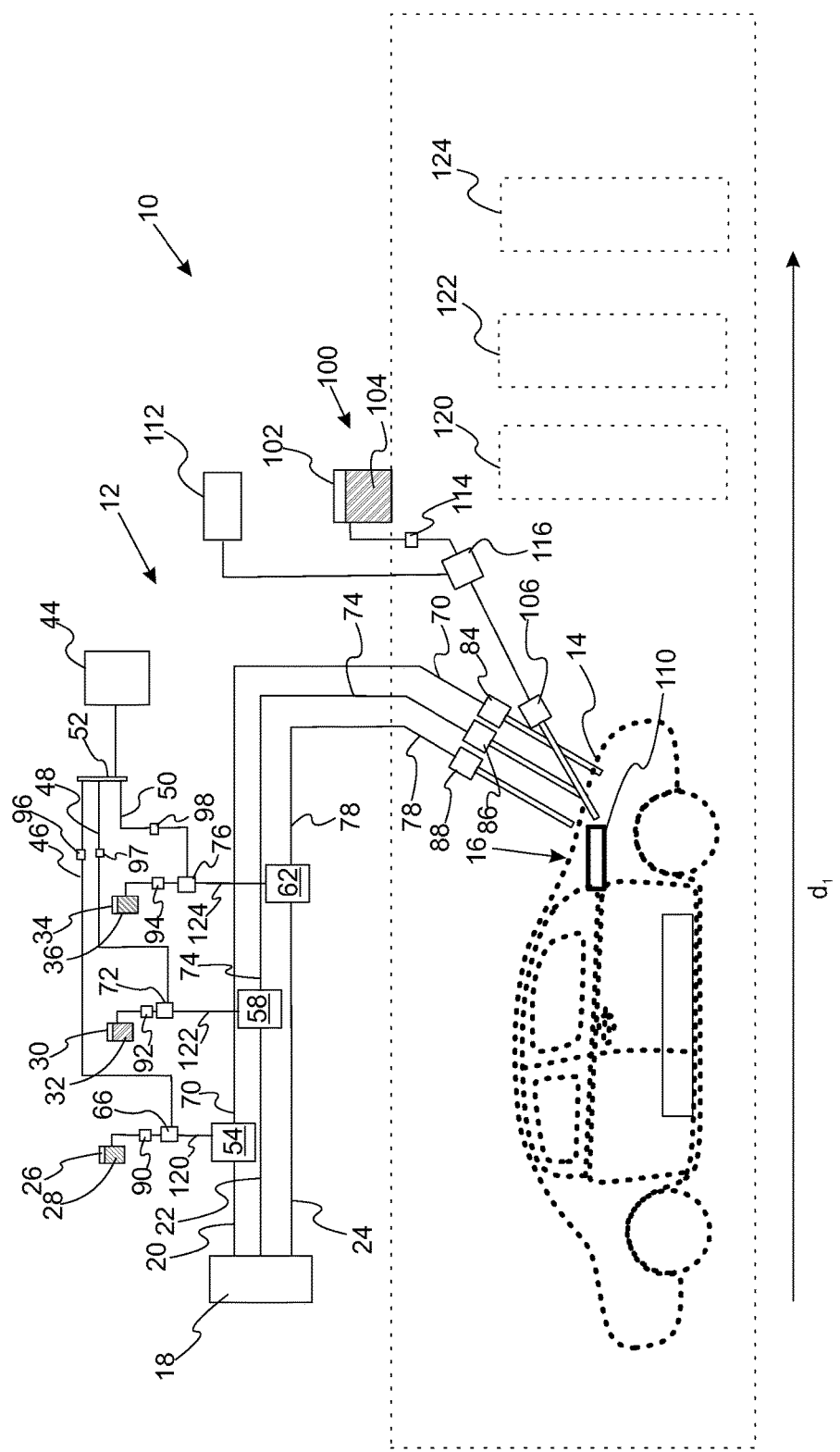
FIG. 3 is a schematic illustration of another embodiment of a car wash including a multi-color detergent delivery system.

With reference to FIG. 3, a schematic illustration of a car wash system using multiple colored cleaning streams is provided. Car wash system 10 includes detergent delivery system 12 which provides colored cleaning steams to exterior vehicle surface 14 of vehicle 16 as the vehicle moves along direction $d_1$. Water source 44 is divided into first water stream 46, second water stream 48, and optional third water stream 50 by divider 52. Vessel 26 contains first concentrated color composition 28. Vessel 30 contains second concentrated color composition 32. Vessel 34 contains third concentrated color composition 36. Typically, the first, second, and third concentrated color compositions possess different colors as described above. First mixer 66 combines the first water stream 46 with first concentrated color composition 28 to form first diluted colored composition 120. Second mixer 72 combines the second water stream 48 with second concentrated colored composition 32 to form second diluted colored composition 122. In a refinement, third mixer 76 combines third water stream 50 with third concentrated colored composition 36 to form third diluted colored composition 124. In a variation, first concentrated color composition 28, second concentrated color composition 32, and third concentrated color composition 36 are essentially free of cleaning surfactants as set forth above.

Still referring to FIG. 3, in a variation, detergent delivery system 12 includes first metering component 90 in fluid communication with vessel 26 which allows user adjustment of an amount of first concentrated color composition 28 combined with first water stream 46. Second metering component 92 in fluid communication with vessel 30 allows user adjustment of an amount of second concentrated color composition 32 combined with second water stream 48. Third metering component 94 in fluid communication with vessel 34 allows user adjustment of the amount of third concentrated color composition 36 combined with third water stream 50. Examples for first metering component 90, second metering component 92, and third metering component are set forth above. Cleaning composition delivery system 12 includes water regulators 96, 97, 98 to regulate and control the flow of first water stream 46, second water stream 48, and third water stream 50 also as set forth above.

Still referring to FIG. 3, cleaning composition source 18 includes a detergent composition and is divided into a first cleaning composition stream 20, a second cleaning composition stream 22, and an optional third cleaning composition stream 24. First mixing block 54 combines the first cleaning composition stream 20 with first diluted color composition 120 to form first diluted colored cleaning composition 70. Second mixing block 58 combines second cleaning composition stream 22 with second diluted color composition 122 to form second diluted colored cleaning composition 74. In a refinement, third mixing block 62 combines third cleaning composition stream 24 with third diluted color composition 124 to form third diluted colored cleaning composition 78. Examples of suitable mixing blocks are set forth above. First foaming system 84 receives first diluted colored cleaning composition 70 and delivers the first diluted colored cleaning composition to vehicle surface 14 of vehicle 16. Second foaming system 86 receives second diluted colored cleaning composition 74 and delivers the second diluted colored cleaning composition to the vehicle surface 14 of vehicle 16. In a refinement, third foaming system 88 receives third diluted colored cleaning composition 78 and delivers the third diluted colored cleaning composition to the vehicle surface 14 of vehicle 16. In a refinement, first foaming system 84, second foaming system 86, and third foaming system 88 are each independently a nozzle and in particular, an air driven nozzle.

In a variation of the present embodiment, car wash system 10 further includes fragrance delivery system 100 for providing a fragrance to an exterior surface of vehicle 14. The details of fragrance delivery system 100 as set forth above in connection with the description of FIG. 1.

In a refinement of the embodiments and variations set forth above, cleaning composition includes anionic, non-ionic, amphoteric or cationic surfactants, or combination thereof, water, agents to modify viscosity or pH, agents to modify foaming levels may be added. Typically, the level of activity (i.e., the volume percent of active ingredients) is from 10% to 100% and the pH is from 2.0 to 10.0. Typically, no colorants or fragrance is added. In a refinement, the detergent composition is diluted from 1 to 50 to 1 to 500. The viscosity at 25° C. is from 1 to 500 centipoise. The detergent composition is designed to produce high level of foam which is easily rinsed away with standard car washing equipment.

In a refinement of the embodiments and variations set forth above, the colorant is selected from the group consisting of natural and/or synthetic dye(s) or pigment(s) of the azo, acid, solvent, reactive or other chemical families or a combination thereof. The colorant may be combined with water, surfactant(s), glycol containing compound(s), a solvent or other diluent(s) or a combination thereof. Agents to modify viscosity and pH are optionally added. The level of activity for the colorant is from 10% to 100%. The pH is typically from 2.0 to 10.0 and the viscosity at 25° C. from 1 to 500 centipoise. Fragrance is typically not added. In a refinement, the colorant is diluted from 1 to 10 to 1 to 1000. The colorant is formulated to be chemically compatible with detergent(s) composed of anionic, non-ionic, amphoteric or cationic surfactants or any combination thereof. In a refinement, the colorant is that of a primary color (red, yellow or blue) or any combination thereof. In a further refinement, the colorant is fluorescent in nature, activated by artificial or natural ultraviolet light rays.

In a refinement of the embodiments and variations set forth above, the fragrance composition is selected from natural and/or synthetic fragrance oils(s) or organic compounds(s) that impart an odor or a combination thereof. The fragrance composition is optionally combined with water, surfactant(s), glycol containing compound(s), alcohol(s), solvent(s) or other diluent(s) or a combination thereof. In a further refinement, agents to modify viscosity and pH are added. The level of activity is typically from 10% to 100%. The pH ranges from 2.0 to 10.0 and the viscosity at 25° C. from 1 to 500 centipoise. The fragrance may be diluted from 1 to 10 to 1 to 1000. Fragrance composition advantageously has an odor of natural fruits or foodstuffs, or other natural or synthetic odors.

It should be appreciated that car wash system 10 also include additional car wash components such as scrubbing stations 120, rinsing stations 122, and drying stations 124.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for cleaning a vehicle, the system comprising:
a first cleaning composition stream;
a second cleaning composition stream;
a first concentrated color composition;
a second concentrated color composition;
a first water stream;
a second water stream;
a first water regulator to control flow of the first water stream;
a second water regulator to control flow of the second water stream;
a first mixing block that combines the first cleaning composition stream with the first concentrated colored composition, the first mixing block outputting a first colored cleaning composition;
a second mixing block that combines the second cleaning composition stream with the second concentrated colored composition, the second mixing block outputting a second colored cleaning composition;
a first mixer that combines the first water stream and the first colored cleaning composition to form a first diluted colored cleaning composition;
a second mixer that combines the second water stream and the second colored cleaning composition to form a second diluted colored cleaning composition;
a first foaming system that receives the first diluted colored cleaning composition, the first foam system delivering the first diluted colored cleaning composition to the vehicle;
a second foaming system that receives the second diluted colored cleaning composition, the second foam system delivering the second diluted colored cleaning composition to the vehicle, the first concentrated color composition and the second concentrated color composition being essentially free of cleaning surfactants;
a first metering component allowing user adjustment of an amount of the first concentrated color composition combined with the first cleaning composition stream; and
a second metering component allowing user adjustment of an amount of the second concentrated color composition combined with the second cleaning composition stream.

2. The system of claim 1 further comprising:
a third cleaning composition stream;
a third water stream;
a third water regulator to control the flow of the third water stream;
a third concentrated color composition;
a third mixing block that combines the third cleaning composition stream with the third concentrated colored composition, the third mixing block outputting a third colored cleaning composition;
a third mixer that combines the third water stream and the third colored cleaning composition to form a third diluted colored cleaning composition; and
a third foaming system that receives the third diluted colored cleaning composition, the third foam system delivering the third diluted colored cleaning composition to the vehicle.

3. The system of claim 2 wherein the third concentrated color composition has a color that is different than a color of the first concentrated color composition and a color of the second concentrated color composition.

4. The system of claim 2 further comprising:
a third metering component allowing user adjustment of the amount of the third concentrated color composition combined with the third cleaning composition stream.

5. The system of claim 1 wherein a ratio of water to the first colored cleaning composition in the first diluted colored cleaning composition is from 75:1 to 500:1 and a ratio of water to the second colored cleaning composition in the second diluted colored cleaning composition is from 75:1 to 500:1.

6. The system of claim 1 further comprising a fragrance delivery system for providing a fragrance to an exterior surface of the vehicle.

7. The system of claim 6 wherein the fragrance delivery system includes a nozzle position to provide the fragrance in vicinity of an automobile air intake vent.

8. The system of claim 1 wherein the first foaming system and the second foaming system are each independently a nozzle.

9. The system of claim 1 wherein the first foaming system and the second foaming system are each independently an air driven nozzle.

10. A system for cleaning a vehicle, the system comprising:
a first cleaning composition stream;
a second cleaning composition stream;
a third cleaning composition stream;
a first concentrated color composition;
a second concentrated color composition;
a third concentrated color composition;
a first water stream;
a second water stream;
a third water stream;
a first water regulator to control flow of the first water stream;
a second water regulator to control flow of the second water stream;
a third water regulator to control flow of the third water stream;
a first mixing block that combines the first cleaning composition stream with the first concentrated colored composition, the first mixing block outputting a first colored cleaning composition;
a second mixing block that combines the second cleaning composition stream with the second concentrated colored composition, the second mixing block outputting a second colored cleaning composition;
a third mixing block that combines the third cleaning composition stream with the third concentrated colored composition, the third mixing block outputting a third colored cleaning composition;
a first mixer that combines the first water stream and the first colored cleaning composition to form a first diluted colored cleaning composition;
a second mixer that combines the second water stream and the second colored cleaning composition to form a second diluted colored cleaning composition;
a third mixer that combines the third water stream and the third colored cleaning composition to form a third diluted colored cleaning composition;
a first foaming system that receives the first diluted colored cleaning composition, the first foam system delivering the first diluted colored cleaning composition to the vehicle;

a second foaming system that receives the second diluted colored cleaning composition, the second foam system delivering the second diluted colored cleaning composition to the vehicle, the first concentrated color composition and the second concentrated color composition being essentially free of cleaning surfactants;

a third foaming system that receives the third diluted colored cleaning composition, the third foam system delivering the third diluted colored cleaning composition to the vehicle;

a fragrance delivery system for providing a fragrance to an exterior surface of the vehicle;

a first metering component allowing user adjustment of an amount of the first concentrated color composition combined with the first cleaning composition stream;

a second metering component allowing user adjustment of an amount of the second concentrated color composition combined with the second cleaning composition stream; and a third metering component allowing user adjustment of the amount of the third concentrated color composition combined with the third cleaning composition stream.

11. The system of claim 10 wherein a ratio of water to the first colored cleaning composition in the first diluted colored cleaning composition is from 75:1 to 500:1, a ratio of water to the second colored cleaning composition in the second diluted colored cleaning composition is from 75:1 to 500:1, and a ratio of water to the third colored cleaning composition in the third diluted colored cleaning composition is from 75:1 to 500:1.

12. The system of claim 10 wherein the fragrance delivery system includes a nozzle position to provide the fragrance in vicinity of an automobile air intake vent.

13. The system of claim 10 wherein the first foaming system, the second foaming system, and the third foaming system are each independently a nozzle.

14. The system of claim 10 wherein the first foaming system, the second foaming system, and the third foaming system are each are each independently an air driven nozzle.

15. A system for cleaning a vehicle, the system comprising:

a first cleaning composition stream;
a second cleaning composition stream;
a first concentrated color composition;
a second concentrated color composition;
a first water stream;
a second water stream;
a first water regulator to control flow of the first water stream;
a second water regulator to control flow of the second water stream;
a first mixer that combines the first water stream and the first cleaning composition stream to form a first diluted cleaning composition stream;
a second mixer that combines the second water stream and the second cleaning composition stream to form a second diluted cleaning composition stream;
a first mixing block that combines the first diluted cleaning composition stream with the first concentrated colored composition, the first mixing block outputting a first diluted colored cleaning composition;
a second mixing block that combines the second diluted cleaning composition stream with the second concentrated colored composition, the second mixing block outputting a second diluted colored cleaning composition;
a first foaming system that receives the first diluted colored cleaning composition, the first foam system delivering the first diluted colored cleaning composition to the vehicle;
a second foaming system that receives the second diluted colored cleaning composition, the second foam system delivering the second diluted colored cleaning composition to the vehicle, the first concentrated color composition and the second concentrated color composition being essentially free of cleaning surfactants;
a first metering component allowing user adjustment of an amount of the first concentrated color composition combined with the first cleaning composition stream; and
a second metering component allowing user adjustment of an amount of the second concentrated color composition combined with the second cleaning composition stream wherein a ratio of water to the first cleaning composition stream in the first diluted cleaning composition stream is from 75:1 to 500:1 and a ratio of water to the second cleaning composition stream in the second diluted cleaning composition stream is from 75:1 to 500:1 and wherein the first foaming system and the second foaming system are each independently a nozzle.

* * * * *